United States Patent [19]

Brockhaus

[11] Patent Number: 4,950,123
[45] Date of Patent: Aug. 21, 1990

[54] RETRACTABLE BED FOR TRUCK

[75] Inventor: Peter B. Brockhaus, Owen, Wis.

[73] Assignee: Donald Volhard, Marathon City, Wis.; a part interest

[21] Appl. No.: 109,763

[22] Filed: Oct. 19, 1987

[51] Int. Cl.⁵ .................................................. B60P 1/00
[52] U.S. Cl. ................................. 414/522; 296/37.1; 224/42.44; 414/462
[58] Field of Search ............... 414/522, 462; 108/64, 108/114; 224/281, 42.07, 310, 42.43, 42.44, 42.08; 296/37.1

[56] References Cited

U.S. PATENT DOCUMENTS

| | | | |
|---|---|---|---|
| 1,665,642 | 4/1928 | Sankey | 224/42.44 X |
| 3,028,025 | 4/1962 | White | 414/522 |
| 3,471,045 | 10/1969 | Panciocco . | |
| 3,687,314 | 8/1972 | Haugland . | |
| 3,718,225 | 2/1973 | Duran . | |
| 3,726,422 | 4/1973 | Zelin . | |
| 3,768,673 | 10/1973 | Nydam et al. . | |
| 3,826,529 | 7/1974 | Wood . | |
| 4,081,095 | 3/1978 | Wiburn et al. | 414/522 X |
| 4,303,367 | 12/1981 | Bott . | |
| 4,305,695 | 12/1981 | Zachrich . | |
| 4,573,854 | 3/1986 | MacFarland | 224/42.44 X |
| 4,705,315 | 11/1987 | Cherry | 296/37.1 |

FOREIGN PATENT DOCUMENTS

| | | | |
|---|---|---|---|
| 1097389 | 3/1981 | Canada | 414/522 |
| 2579146 | 9/1986 | France | 414/522 |

Primary Examiner—Frank E. Werner
Attorney, Agent, or Firm—Fuller, Ryan & Hohenfeldt

[57] ABSTRACT

A retractable bed is capable of handling heavy cargoes to an extended length approximately double the retracted length. The retractable bed comprises a fixed frame, a secondary frame, and a top frame. A unique arrangement of rollers engages the various frames. The top frame, which supports the cargo deck, is supported by both the fixed and secondary frames. The invention includes a locking device that is spring loaded to automatically lock the frames in selected locations between the extended and retracted positions. The locking device has a handle that extends to the front of the top frame, where it is conveniently operated by a person.

7 Claims, 2 Drawing Sheets

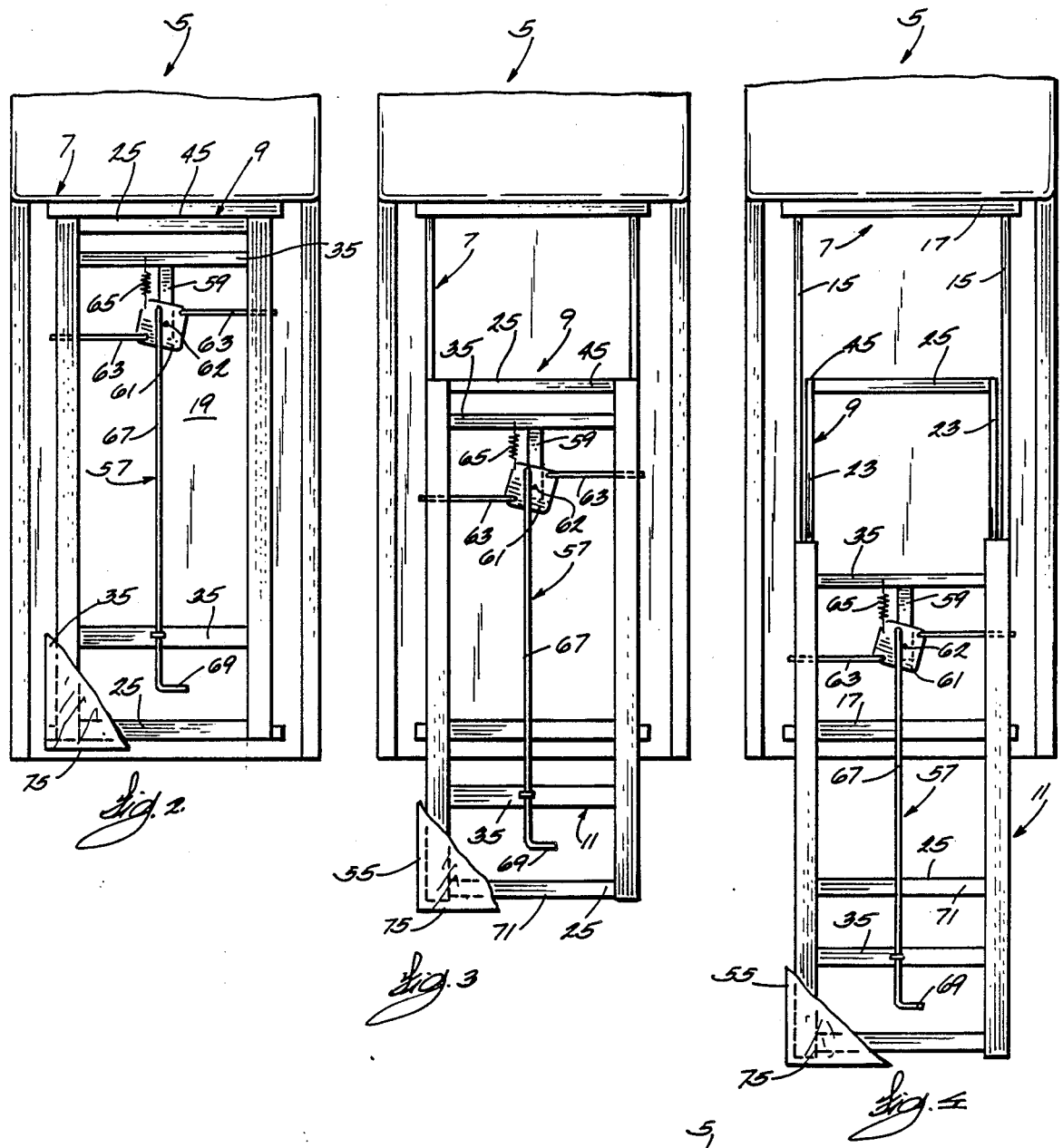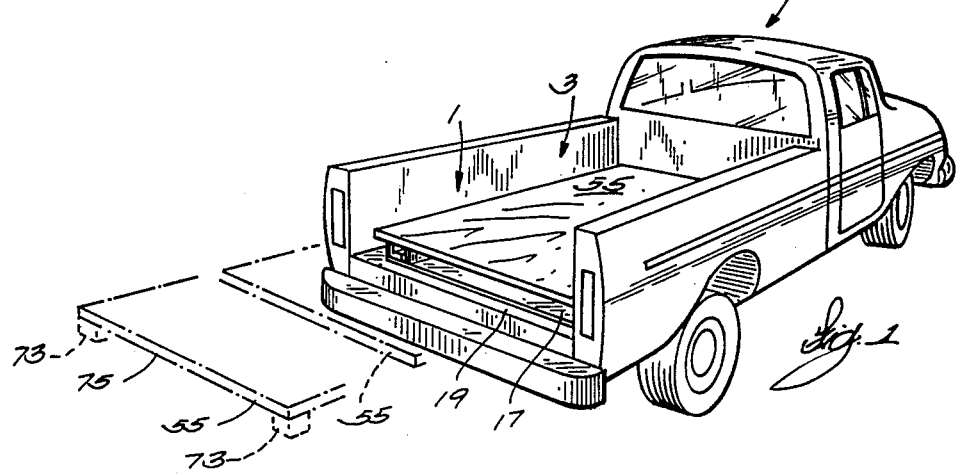

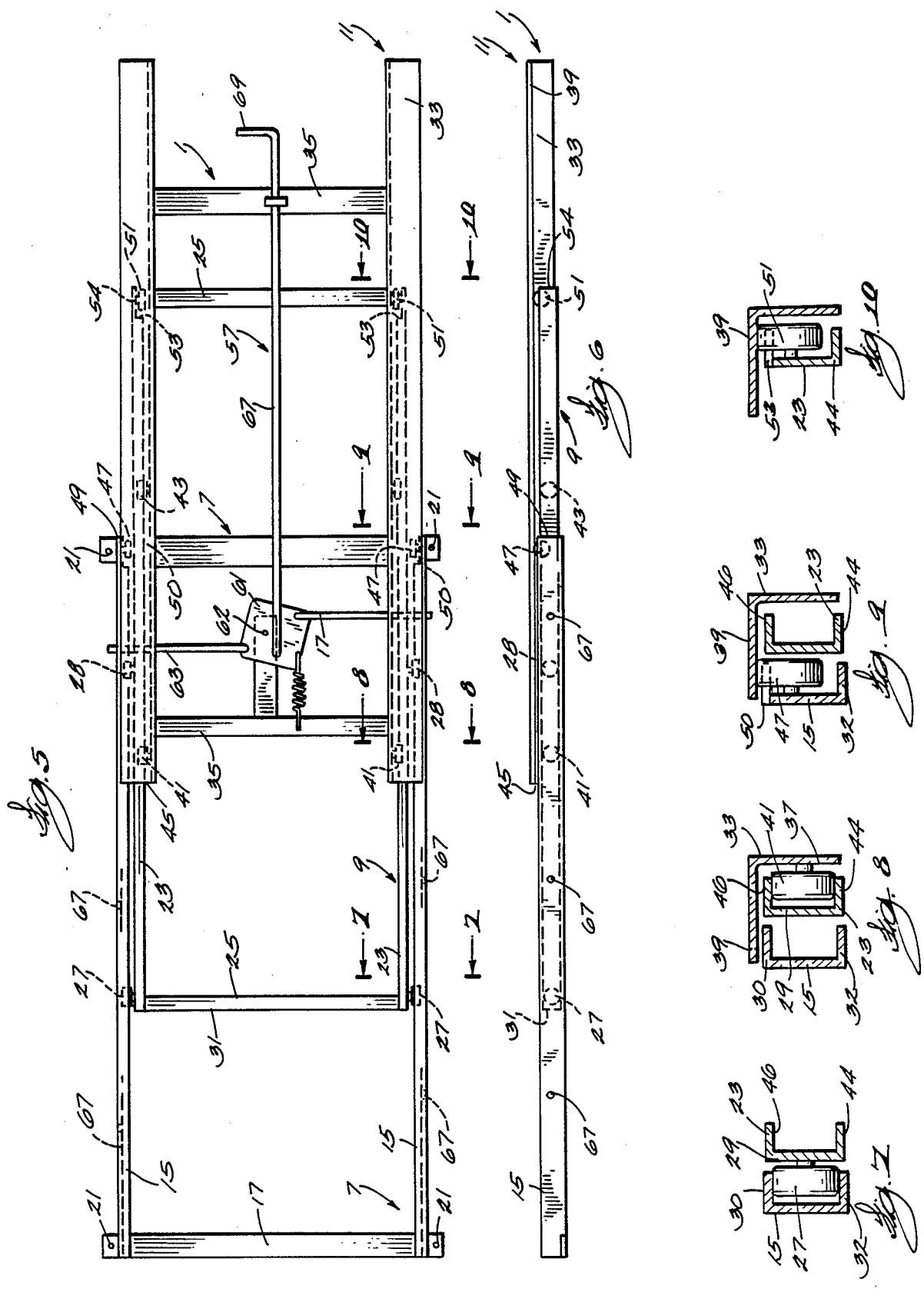

RETRACTABLE BED FOR TRUCK

BACKGROUND OF THE INVENTION

1. Field of the Invention

This invention pertains material handling, and more particularly to apparatus that facilitates loading and unloading automotive vehicles.

2. Description of the Prior Art

Various equipment has been developed to assist loading cargo into and unloading it from motor vehicles. For example, U.S. Pat. No. 3,718,225 shows a carrier assembly for loading and transporting a rather large and heavy object, such as a snowmobile, on the rear deck of an automobile. U.S. Pat. No. 3,687,314 illustrates a dolly that rolls on the floor of a truck. A platform is hinged to the dolly. The platform may be tilted to contact the ground or to lie flat on the truck bed. U.S. Pat. No. 4,305,695 discloses a tray that rolls in and out along a frame connected to the floor of a station wagon. The bearing length of the tray on the frame is very short, thereby requiring a support prop to support the tray outer end. The container of U.S. Pat. No. 4,303,367 slides on rails attached to a station wagon floor without rollers and is therefore limited to carrying light loads.

U.S. Pat. Nos. 3,826,529; 3,471,045; 3,726,422; and U.S. Pat. No. 3,768,673 describe additional designs of racks or platforms that are slidable within a truck or other vehicle. The platforms of the aforementioned patents possess certain disadvantages that restrict their usefulness. Probably the greatest handicap of the prior retractable platforms is the limited distance beyond the end of the vehicle to which the platforms can extend. Travel in the prior equipment is limited because the cargo platforms roll along a single fixed track or guide. Another disadvantage of prior designs involves the structures for securing the movable platforms in place, both in the extended and retracted positions. For example, the designs of U.S. Pat. No. 3,471,045 and U.S. Pat. No. 3,826,472 depend on the truck tailgate to hold the retracted movable carriage or rack in place. With such a design, the truck cannot be parked with the back end sloping down hill, because the carriage or rack will dangerously roll backward immediately upon lowering the tailgate. The locking means of U.S. Pat. No. 3,726,422 employs a pin that extends into the luggage tray, where it is awkward to reach.

Thus, a need exists for improved equipment that aids loading and unloading motor vehicles.

SUMMARY OF THE INVENTION

In accordance with the present invention, a retractable bed is provided that is capable of safely extending heavy loads to greater distances from a retracted position than was previously possible. This is accomplished by apparatus that includes a lockable roller and track system arranged to telescope into and out of a cargo carrier, such as a motor vehicle.

The roller and track system comprises two frames that are movable relative to each other and a primary frame. The primary frame is fixedly mounted to the bed of the vehicle and is preferably comprised of a pair of laterally spaced structural beams that may be inwardly facing channels. The first movable frame, called a secondary frame, comprises a pair of laterally spaced beams that may be inwardly facing channels that are placed horizontally inwardly of and adjacent the respective fixed channels. The secondary frame channels are equipped with several rollers that ride in the fixed frame channels, thereby enabling the secondary frame to reciprocate with respect to the fixed frame.

The second movable frame, called the top frame, is comprised of a pair of structural beams such as angles placed inwardly of the respective secondary channels. The top frame angles have horizontal legs that overlie the secondary and fixed frames. The top frame further includes several rollers that ride within the secondary frame channels. Thus, the top frame is reciprocable within the secondary frame for longitudinal motion relative to both the fixed and secondary frames such that all three frames nest within each other when in the retracted mode.

To permit extending the top frame to great distances from the retracted position, the fixed frame and the secondary frame are equipped with additional rollers that directly support the top frame. For that purpose, the fixed and secondary frame channels are notched at strategic locations, and the additional rollers mounted to the fixed and secondary frames protrude through the respective notches to bear against the undersides of the top frame horizontal legs. The unique arrangement of the channels, angles, and rollers provide a strong and rigid retractable bed that can be extended to approximately double its retracted length.

Further in accordance with the present invention, the movable frames are lockable in place relative to the fixed frame in a quick, convenient, and safe manner. Locking is accomplished by a spring loaded device that automatically locks the frames in any one of several locations between the fully retracted and fully extended positions. The locking device is easily operated by a handle from the front end of the top frame. Consequently, the locking device is always readily accessible to the driver. Other objects, aims, and advantages of the invention will become apparent to those skilled in the art from the disclosure.

BRIEF DESCRIPTION OF THE DRAWINGS

FIG. 1 is a perspective view of a motor vehicle equipped with the retractable bed of the present invention;

FIG. 2 is a partially broken enlarged top view of the retractable bed of the present invention shown in the retracted position in a motor vehicle;

FIG. 3 is a partially broken enlarged top view similar to FIG. 2 but showing the retractable bed in a partially extended position;

FIG. 4 is a partially broken enlarged top view similar to FIG. 3 but showing the retractable bed in a further extended position;

FIG. 5 is an enlarged top view of the retractable bed of the present invention showing the details of construction;

FIG. 6 is a side view of the retractable bed of FIG. 5

FIG. 7 is a cross-sectional view taken along lines 7—7 of FIG. 5;

FIG. 8 is a cross-sectional view taken along lines 8—8 of FIG. 5;

FIG. 9 is a cross-sectional view taken along lines 9—9 of FIG. 5; and

FIG. 10 is a cross-sectional view taken along lines 10—10 of FIG. 5.

DETAILED DESCRIPTION OF THE INVENTION

Referring to FIG. 1, a retractable bed 1 is illustrated that includes the present invention. The retractable bed is particularly useful for loading and unloading the cargo area 3 of a motor vehicle 5, but it will be understood that the invention is not limited to automotive applications.

Turning to FIGS. 2-6, the retractable bed 1 comprises three frames: a fixed frame 7, a secondary frame 9, and a top frame 11. The fixed frame 9 includes a pair of beams, which may be inwardly facing channels 15, that are spaced laterally apart by two or more transverse braces 17. The fixed frame is mounted to the bed 19 of the motor vehicle 5 by conventional fasteners such as bolts or moly anchors that pass through mounting holes 21. To reduce vibrations of the retractable bed and the cargo carried by it, as well as to reduce noise, vibration damping washers, not shown, may be inserted between the braces 17 and the truck bed 19.

The secondary frame 9 comprises a pair of beams 23 that are transversely spaced by two or more braces 25. As best shown in FIGS. 5 and 7, the secondary frame may be comprised of inwardly facing channels 23, each of which is equipped with two rollers 27 and 28 that are mounted to the outboard side of each channel web 29. The dimensions of the fixed frame braces 17 and the secondary frame braces 25 are chosen such that rollers 27 and 28 roll within tracks defined by the channel upper and lower legs 30 and 32, respectively. The rollers fit between the channel legs 30 and 32 with minimum vertical clearance. Preferably, a pair of rollers 27 is mounted to the back end 31 of the secondary frame, and a second pair of rollers 28 is mounted about midway between the two ends of the secondary frame. Thus, the secondary frame is capable of rolling reciprocation along the fixed frame 7.

The top frame 11 comprises a pair of angles 33 that are laterally spaced apart by two or more braces 35. Referring primarily to FIG. 8, each angle 33 is composed of a vertical leg 37 and a horizontal leg 39. The angles are arranged with the vertical legs 37 inboard of the respective secondary frame channels 23 and with the horizontal legs 39 overlying the fixed frame and secondary frame channels 15 and 23, respectively. The angles are equipped with pairs of rollers 41 and 43 that are mounted to the outsides of the vertical legs 37. The pair of rollers 41 is mounted at the back end 45 of the angles, and the second pair 43 is mounted at approximately the midpoint of the angles. The rollers 41 and 43 ride within the tracks provided by the secondary frame channel horizontal legs 44 and 46, thus permitting the top frame to reciprocate within the secondary frame.

To provide additional support for the top frame 11, a pair of rollers 47 is mounted to the front end of the fixed frame 7, as best shown in FIG. 9. The upper leg 30 of each fixed frame channel 15 is cut with a notch 50. The rollers 47 are mounted to the insides of the channel webs such that the rollers 47 extend upwardly through the notches 50 to bear against and support the undersurfaces of the top frame channel horizontal legs 39. Since the secondary frame 9 is captured by means of rollers 41 and 43 to the top frame, supporting the top frame with the rollers 47 also supports the secondary frame.

For providing even further strength and rigidity to the retractable bed 1 of the present invention, the front end of the secondary frame 9 is furnished with a third pair of rollers 51. As best shown in FIGS. 5 and 10, the rollers 51 are mounted to the insides of the secondary channel webs 29 and extend upwardly through notches 53 formed in the front ends 54 of the secondary channel upper legs 46 to bear against the undersides of the top frame channel horizontal legs 39. Accordingly, the top frame has maximum support for all positions thereof along the fixed and secondary frames.

Referring to FIGS. 1-4, a deck 55 is fastened to the top of the top frame horizontal legs 39. The deck 55 may be of any suitable material and in any configuration to suit the particular cargo to be handled by the vehicle 5 and the adjustable bed 1. Fastening of the deck to the top frame may be accomplished by conventional fasteners that best suit the particular application.

The unique design of the frames and rollers enables the retractable bed 1 of the present invention to support heavy loads at great overhangs. The secondary frame 9 is designed such that when fully extended, its back end 45 is at approximately the midpoint of the fixed frame 7. When the top frame 11 is fully extended, the secondary frame front end 71 is at approximately the midpoint of the top frame. The double overlapping structural components at the fully extended position result in the ability of the retractable bed to extend to approximately double its retracted length and still provide a strong and rigid support for cargo on the deck 55. The incorporation of the large number of rollers into the track and roller system assures smooth operation even at the fully extended position.

To safely lock the cargo carrying top frame 11 and the secondary frame 9 in a number of locations with respect to the fixed frame 7, the retractable bed 1 of the present invention includes a convenient locking mechanism 57. In the illustrated construction, the locking mechanism 57 comprises a horizontal bracket 59 attached to the back brace 35 of the top frame. To the brace 59 is pivotally mounted a plate 61 by means of a pin 62. A pair of elongated latch pins 63 extend horizontally and non-coaxially in opposite directions from the plate 61. The latch pins 63 are free to pivot in the plate about respective vertical axes. A tension spring 65 biases the plate in the clockwise direction with respect to FIGS. 2-5, thereby urging the latch pins outwardly toward the retractable bed channels and angles. The latch pins are engageable in any of a number of alignable horizontal holes 67 (FIGS. 5 and 6) that are formed in the webs of the channels 15 and 23 and in the vertical legs of the angles 33. When the latch pins engage all three frames, the retractable bed is firmly locked in that position. The spring 65 biases the pins into locking engagement with the frames, thereby contributing to the safety of the invention. To release the latch pins from the locked mode, an elongated control rod 67 has one end pivotally attached to the plate 61 and eccentric to the pin 62. The second end of the control rod 67 extends to and is guided in the front brace 35 of the top frame 11. A bent handle 69 provides convenient access to the driver for releasing the lock mechanism 57 when desired.

It will be appreciated that the retractable bed of the present invention lends itself to numerous variations. For example, the fixed frame 7 may be permanently fastened to the truck bed 19, such as by rivets in combination with the holes 21. Light duty applications may permit elimination of one or more of the braces 17. The deck 55 can have built-in sides or stake pockets, depending upon the particular cargo to be handled. The front end of the deck may be equipped with tail lights 73 for use when carrying long pipes or lumber. The tail lights 73 are connected by spiral electrical cords so as to automatically adjust to the bed extension. The undersurface of the front end 75 of the deck can be equipped with rollers for resting on a loading dock that has a height above the ground approximately equal to the height of the deck. Such an auxiliary roller would be particularly beneficial when the retractable bed of the present invention is used in conjunction with long semi-trailers. The retractable bed may be supplied in various sizes to suit different vehicle dimensions and types and weights of the cargoes to be handled. In heavy-duty applications, a greater number of rollers 27, 28, 41, 43, 49, or 51 may be employed.

Without further description, it is thought that the advantages to be gained from the disclosed embodiment of the invention will be apparent to those skilled in the art. Furthermore, it is contemplated that various modifications and changes may be made to the retractable bed of the present invention within the scope of the appended claims without departing from the spirit of the invention.

I claim:

1. A track and roller system for horizontally moving a load longitudinally over a surface between front and back positions comprising:
   a. a top frame comprising:
      i. a deck to support the load;
      ii. first and second elongated laterally spaced beams having front and back ends for supporting the deck;
      iii. a first roller mounted to the back end of each beam; and
      iv. a second roller mounted to each beam at approximately the midpoint thereof;
   b. a secondary frame comprising:
      i. first and second elongated beams having lengths approximately equal to the respective top frame beams and having front and back ends and underlying at least a portion of the respective top frame beams, the secondary frame beams being adapted to receive the first and second rollers mounted to the respective top frame beams for permitting the top frame to reciprocate longitudinally along the secondary frame between the front and back positions;
      ii. a first roller mounted to the back end of each beam;
      iii. a second roller mounted to each beam at approximately the midpoint thereof; and
      iv. a third roller mounted to the front end of each beam and protruding thereabove to support the respective top frame beam; and
   c. a fixed frame comprising:
      i. first and second elongated beams having lengths approximately equal to the lengths of the respective secondary frame beams and having front and back ends, the fixed frame beams being fixedly mounted to the surface and underlying at least a portion of the respective top frame beams, the fixed frame beams being adapted to receive the first and second rollers of the secondary frame to thereby permit longitudinal reciprocation of the secondary frame along the fixed frame between the front and back positions; and
      ii. a roller mounted to the front end of each beam and protruding above the beam to support the overlying top frame beam, so that the top and secondary frames can be extended from the fixed frame to an extended length approximately double the length of the fixed frame.

2. The track and roller system of claim 1 further comprising:
   a. a plate pivotally mounted to the back end of the top frame;
   b. at least one latch pin having a first end pivotally mounted to the plate and a second end received in a hole in the top frame and reciprocable to engage and disengage alignable holes formed in the fixed frame and secondary frame; and
   c. control means for pivoting the plate to selectively engage and disengage the latch pin in aligned fixed and secondary frame holes, so that the frames are lockable against reciprocation at selected locations between the front and back positions.

3. The track and roller system of claim 2 further comprising spring means for biasing the latch pin into locking engagement with the fixed and secondary frames.

4. The track and roller system of claim 2 wherein the control means comprises a control rod pivotally received in the plate and extending to the top frame front end to thereby enable a person to conveniently operate the latch pins from a location remote from the latch pins.

5. The track and roller system of claim 1 wherein:
   a. the fixed and secondary frame beams are laterally spaced inwardly facing channels, the secondary frame channels lying adjacent and inwardly of the respective fixed frame beams; and
   b. the top frame beams are transversely spaced angles having vertical legs lying adjacent and inwardly of the respective secondary frame channels and having horizontal legs that overlie the respective adjacent fixed and secondary channels.

6. The track and roller system of claim 5 wherein the front ends of the top legs of each fixed and secondary frame channel are formed with notches, and wherein the third rollers in the secondary frame and the rollers in the fixed frame are mounted to the respective channel webs and protrude through the respective channel notches to support the overlying top frame horizontal leg.

7. A retractable bed mounted to a support comprising:
   an elongated fixed frame having front and back ends and being fixedly mounted to the support, the fixed frame including a pair of laterally spaced inwardly facing channels;
   an elongated secondary frame mounted for longitudinal reciprocation within the fixed frame, the secondary frame comprising a pair of laterally spaced inwardly facing channels and a plurality of first rollers mounted at the back ends and at approximately midpoints of the channels and adapted to ride within the fixed frame channels; and
   an elongated top frame mounted for longitudinal reciprocation within the secondary frame, the top frame comprising a pair of laterally spaced angles having horizontal legs overlying the fixed and secondary frame channels and a plurality of rollers mounted at the back ends and at the approximate midpoints of the angles and adapted to ride within the secondary frame channels;

said fixed frame also including a pair of rollers, one mounted to each of said fixed frame channels at the front ends thereof, said fixed frame rollers extending above the respective channels to support the overlying top frame so that said top frame is directly supported by said fixed frame;

said secondary frame also including a pair of second rollers, each mounted to a respective one of said secondary frame channels at the front end thereof, and extending above said channels to support the overlying top frame to thereby increase the strength and rigidity of the retractable bed;

so that said secondary and top frames are reciprocable with respect to each other and to said fixed frame between retracted and extended positions, and so that said frames have double overhang to provide strength and rigidity at said extended position.

* * * * *